April 10, 1962 L. C. MUSILLI 3,028,766
FLEXIBLE UNIVERSAL STEERING ASSEMBLY
Filed Dec. 23, 1958
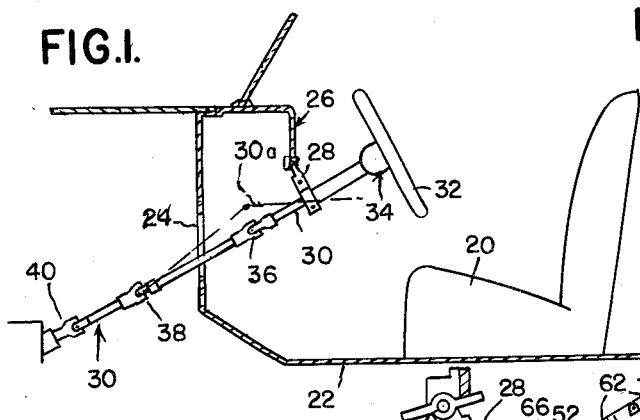
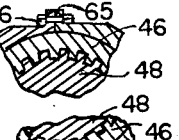
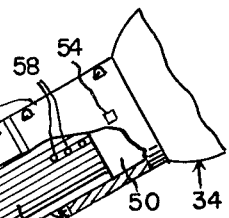
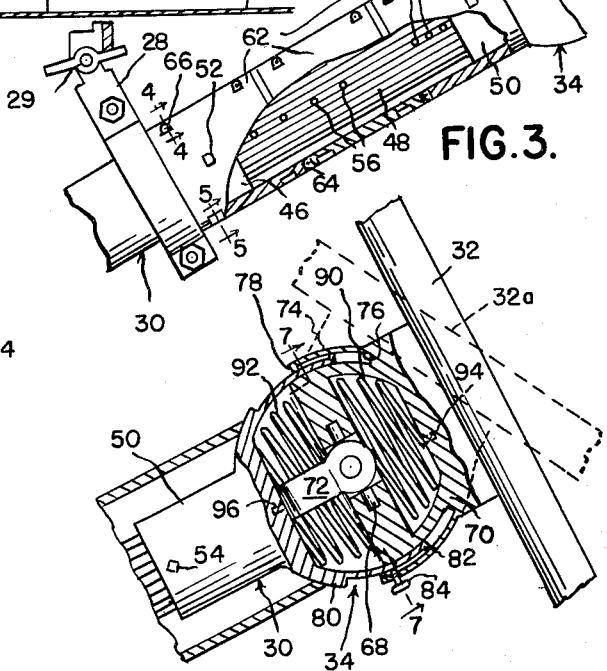
INVENTOR.
LOUIS C. MUSILLI
BY
Whittemore, Hulbert & Belknap
ATTORNEYS

United States Patent Office 3,028,766
Patented Apr. 10, 1962

3,028,766
FLEXIBLE UNIVERSAL STEERING ASSEMBLY
Louis C. Musilli, 19692 Greeley, Detroit, Mich.
Filed Dec. 23, 1958, Ser. No. 782,441
3 Claims. (Cl. 74—492)

This application pertains to a mounting for and assembly of a steering wheel and column, and more particularly, to a column having one or more universal joints formed therealong and a self-centering universal connection to the steering wheel.

It is an essential object of this invention to provide a steering column between a steering wheel and a steering gear having one or more universal joints formed therealong and which is mounted to a vehicle dash by means of a swinging bracket so that the attitude and conformation of the column may be changed as desired without impairing the torque transfer between the steering wheel and the steering gears.

It is another object to provide a steering column mounted between a steering wheel and steering gears which is connected by means of a fixed bracket to the vehicle instrument panel or other member and which has a pair of universal joints spaced therealong to provide a first substantially horizontal column section leading from the instrument panel or other member and a second downwardly directed portion leading to the steering gear thereby removing the steering column from the lower areas of the passenger compartment to provide more knee and foot room therein.

It is a further object of this invention to provide a steering column between a steering wheel and a steering gear having a spline and mating receiving shaft formed intermediately thereof at a portion adjacent the steering wheel, with releasable clamp means for securing the spline in the receiving member and with the spline being longitudinally movable relative the receiving means when said clamp means is in a released position to provide an axial or longitudinal adjustment of the steering column.

It is a further object to provide a series of hinged covers of various sizes for encircling the aforementioned spline member with cover sections of various sizes being replaceable so that a covering is provided for a multiplicity of longitudinal or axial spline adjustments.

It is another object of this invention to provide a self-centering universal connection between the steering wheel and steering column so that the steering wheel is tiltable relative the steering column but is fixed rotatively relative the steering column and will automatically return to a centered position when the tilting force is relieved.

It is a further object of this invention to provide in such a structure clamp means for holding the steering wheel in an adjusted position against the automatic return mechanism.

It is a further object to provide frusto-spherical covers connected to the steering wheel and to the steering column with the end periphery of the spheres being in overlapped relation so that through the entire range of steering wheel positions a continuous cover surface is provided the self-centering universal joint.

These and other objects will become more apparent when a detailed description of this invention is made in connection with the drawing, in which:

FIGURE 1 is a partial sectioned view of a vehicle having a steering column assembly of this invention.

FIGURE 2 is a view similar to FIGURE 1 showing a second embodiment wherein the steering column has a bend formed therein to increase knee and foot room.

FIGURE 3 is a partial, enlarged, broken away view of the steering column adjacent the steering wheel.

FIGURE 4 is a further enlarged section taken at 4—4 of FIGURE 3.

FIGURE 5 is an enlarged section taken at 5—5 of FIGURE 3.

FIGURE 6 is a partial, enlarged, sectional view of the self-centering connection between the steering wheel and the steering column, and FIGURE 7 is a section taken on the line 7—7 of FIGURE 6.

In modern automobile designs the interior passenger space is becoming more and more confined and is now at the point where a vehicle entry and operation is becoming difficult and uncomfortable. One of the major difficulties is that the clearance between the steering wheel and the driver's seat is decreasing so that it is difficult for larger people to gain entry into the driver's seat and it is difficult to make proper seat adjustment since the steering wheel is in interfering position. Also, the area for the operator's legs and feet is becoming lessened and it is increasingly desirable to enlarge this area to a maximum.

This invention provides for a tiltable steering wheel mounted to the steering column so that the wheel may be temporarily upwardly displaced upon operator entry and will automatically return to a centered position after such entry. Also, means are provided for retaining the wheel in a lifted or other tilted position during driving. Also, the steering column is movable to various positions to accommodate driver size and preference.

In the drawings, and especially in FIGURE 1, is shown a section view of a vehicle operator compartment wherein a vehicle seat 20 is supported on a vehicle body panel 22 which has a dash board 26 attached thereto. Swingably mounted to dash board 26 is a clampable bracket 28 through which extends a rotatable steering column 30 having a steering wheel 32 mounted thereto by means of self-centering universal assembly 34. Formed intermediately of column 30 are conventional universal joints 36, 38 of the cross-trunnion type and the end of column 30 is drivingly engaged with a steering gear unit 40 so that rotation or torque applied to wheel 32 is transmitted through shaft 30 to steering gear 40. The gear unit 40 also embodies a universal joint.

In this embodiment, the inclination and configuration of column 30 may be changed by loosening clamp unit 29 of bracket 28 and swinging the bracket clockwise or counterclockwise about a horizontal axis with universals 36, 38 and 40 flexing until column 30 reaches an adjusted position. Bracket 28 may be re-clamped in position of adjustment whereby the angle or attitude of steering wheel 32 is correspondingly changed as shown at 30a. The panel 22 has a narrow vertical slot 24 to laterally confine the column 30.

In a second embodiment (FIGURE 2), a vehicle seat 20 is shown supported on a vehicle body panel 22' which has a narrow vertical opening 24' formed therein to laterally confine column 30' and a dash 26'. A universal joint 34' is interposed in the steering column 30' attached to the dash 26'. Joint 34' is similar to joint 34 as will appear below.

The steering column 30' has mounted at one end thereof a steering wheel 32 through a self-centering universal joint 34 to be later described in more detail. In this embodiment the conventional universal joints 38', 40' are located intermediately of shaft 30' and impart thereto a permanent bend which removes the column 30' from the knee and foot area of the operator to increase valuable leg and foot movement area.

In FIGURES 3–5 is shown a longitudinal adjustment of the steering column which is immediately below the steering wheel in the above embodiments and which is covered from view by a series of hinged cylindrical members. An enlarged portion of the steering column 30 above bracket 28 is shown partially sectioned. The upper end 46 of column 30 is internally splined and slidably receives for longitudinal adjustment externally splined shaft 48 which slidably supports at its upper end internally splined section 50 which is fixed to the lower portion of universal 34. Threadedly received in portions 46 and 50 are clamping bolts 52, 54 which may be advanced radially inwardly in their threaded mountings to engage respectively with series of radial holes 56, 58 in shaft 48. Bolt or pin 52 may be aligned with one of the holes 56 to provide a first longitudinal adjustment after which pin 54 may be aligned with one of the holes 58 which are spaced more closely together, to provide a fine longitudinal adjustment. In this manner, universal 34 and steering wheel 32 may be adjusted towards or away from bracket 28 through the proper placement of bolts 52, 54 respectively in holes 56, 58 with relative rotational movement prevented and axial or longitudinal movement provided between ends 46 and 50 and shaft 48 due to the splined engagement therebetween.

After the desired longitudinal adjustment of steering column 30 has been effected, the splined member 48 may be covered by a series of cylindrical sections 62 which are interconnected in stacked relation by overlapped end portions and each of which is separated by an axial plane into cylinder halves which are hinged along one intersection 64 of such a plane. The other, opposite intersection 65, circumference is overlapped and fastened as by a screw 66, or other means. Cylinder sections 62 are made available in various longitudinal lengths so that the spline shaft 48 may be covered for all adjusted positions. A wide range of adjusted positions may be accommodated since one or more of the cylinder sections 62 may be changed at any one time. To reduce vibratory or other noises, the joining sections between adjacent cylinders and between cylinder halves may be coated with a moldable sealant such as a rubber or a suitable plastic. The sections 62 abut bracket 28 at one end, are interconnected to one another by overlapped portions, and abut at the opposite end universal 34. Each section 62 may have a decorative finish such as a chrome plate or an anodized, colored aluminum surface.

An important feature of this invention is the construction and operation of the universal 34 which permits tilting of the steering wheel 32 relative the column 30 and has a self-centering feature. Universal 34 is shown in FIGS. 6 and 7 where is seen a crossed member 68 which has journaled at one pair of opposite ends a semicircular yoke member 70 and at the other pair of opposite ends a semi-circular yoke member 72. Integral with yoke member 70 is a frusto-spherical cover 74 which is fixed to steering wheel 32, and which has formed therein a peripheral slot 76 having an outer wall terminating in an inwardly formed lip 78. Integral with yoke 72 is a frusto-spherical member 80, which is fixed to internally splined end 50. The periphery of member 80 is inserted in overlapping relation in slot 76 and has thereabout an outwardly formed lip 82. Clamping means are available for releasably securing the overlapped portions of spheres 80 and 74 and in this embodiment take the form of a screw 84 which is threadedly engaged with the end of the outer wall of slot 76 and which bears against the sphere 80 when in secured position. It is seen then, that steering wheel 32 may be moved to a wide range of tilted positions relative column 30, such as 32a shown in dotted lines, and clamped in the adjusted positions by inwardly turning threaded members 84.

A self-centering mechanism for steering wheel 32 is provided and comprises a pair of volute springs 90, 92 which are inserted in and dimensionally conform to the inner recesses of yokes 70 and 72 respectively. Springs 90, 92 have at their outer ends axially bent threaded portions 94, 96 which are threadedly engaged with centrally located threaded holes in yokes 70, 72 respectively. A lock washer or other retaining means may be placed about the threaded portions 94, 96 to hold them in secure threaded position. The inner or base ends of springs 90, 92 bear against opposite sides of crossed member 68 so that whenever the wheel 32 is tilted a spring will be compressed and will tend to restore the wheel to a centered position and this will be true regardless of the direction that wheel 32 is tilted. This is especially advantageous when entering or leaving the vehicle since the wheel 32 may be moved in any direction to increase the entrance or exit room and will automatically return to the center position. Also, if desired, the wheel 32 after entry may be adjusted to a desired position to accommodate the physique and driving preferences of the vehicle operator and may be clamped into the desired position. Further, during long trips the wheel position may be changed from time to time to relax the driver's muscles and prevent over-exertion of any particular set of muscles.

The spherical sections 74 and 80 provide an attractive exterior and the lips 78, 82 restrict the movement of the wheel 32 as desired since excessive tilting movement in any direction will cause a limiting engagement therebetween.

The universal joint 34' shown in FIGURE 2 is like the one indicated at 34 except that it does not have the self-centering springs, and in addition it is carried by a bracket fixed to the dash board. The bracket is fixed to the section of the joint which forms an integral part of the intermediate shaft 100 of the column corresponding to member 50 in FIGURE 6. Opening 24' constrains and laterally confines shaft 100 to enable adjustment when the upper section of column 30' is adjusted vertically and locked in position by universal 34'. FIGURE 2 shows by means of dotted lines 101 a modification in which the column is straight from joint 34' to the gear unit 40. Therefore, universal joints 38' and 40' may be omitted.

What I claim as my invention is:

1. A steering assembly for a vehicle having a frame comprising a steering column rotatable with respect to said frame, steering gear secured to one end of said column operable to steer the vehicle in accordance with the rotative position of said column, a steering wheel adjacent the other end of the steering column and a universal joint securing said steering wheel to said other end of said steering column for universal pivotal movement about the other end of the steering column, said universal joint including a cross-shaped member, a pair of oppositely faced arcuate yokes disposed at right angles to each other and pivotally connected at the ends thereof to the ends of the cross-shaped member, said steering wheel being secured centrally to one of said yokes, said column being secured centrally to the other of said yokes, and spherical volute springs having large and small ends positioned between each of said yokes and said cross-shaped member, the small ends of the volute springs being secured centrally of the respective yokes, the large end of the volute springs bearing against said cross-shaped member whereby the springs are operable to bias the universal joint into a central position.

2. Structure as claimed in claim 1 and including a second universal joint connecting said steering column to said steering gear, a third and fourth universal joint in said steering column spaced apart axially thereof, and an adjustable bracket swingable about an axis transverse of the steering column connected to the vehicle and rotatably supporting the steering column between the third and fourth universal joints and the steering wheel to permit ready adjustment of the configuration of the steering column.

3. Structure as claimed in claim 2 and including means to permit relative axial adjustment between said column and wheel comprising a splined member and complementary sleeves therefor which sleeves are attached to said universal joint and said column and are adapted to be fixed axially with respect to said splined member by means of registering openings in said splined member and said sleeves and pins inserted therein.

References Cited in the file of this patent

UNITED STATES PATENTS

| | | |
|---|---|---|
| 791,275 | Lofton | May 30, 1905 |
| 1,324,898 | Hopcraft | Dec. 16, 1919 |
| 1,425,723 | Thomas | Aug. 15, 1922 |
| 1,452,065 | Calahan | Apr. 17, 1923 |
| 1,710,399 | Banning | Apr. 23, 1929 |
| 1,892,108 | Johnson | Dec. 27, 1932 |
| 2,030,511 | Gruber | Feb. 11, 1936 |
| 2,051,248 | Dunn | Aug. 18, 1936 |
| 2,075,110 | Garretson | Mar. 30, 1937 |
| 2,101,727 | Anibal | Dec. 7, 1937 |
| 2,180,430 | Reitz | Nov. 21, 1939 |
| 2,360,962 | Megathlin | Oct. 24, 1944 |
| 2,518,175 | Pinardi | Aug. 8, 1950 |
| 2,622,690 | Barényi | Dec. 23, 1952 |
| 2,627,560 | Eitel | Feb. 3, 1953 |
| 2,716,032 | Barényi | Aug. 23, 1955 |
| 2,770,981 | Fieber | Nov. 20, 1956 |
| 2,865,222 | Bachman | Dec. 23, 1958 |

FOREIGN PATENTS

| | | |
|---|---|---|
| 734,904 | France | Aug. 9, 1932 |